United States Patent [19]

Ray

[11] 4,411,602

[45] Oct. 25, 1983

[54] FUEL INJECTION APPARATUS FOR INTERNAL COMBUSTION ENGINES

[76] Inventor: Earl L. Ray, 113 Chestnut Pl., Rte. 2, Box 393A, Arden, N.C. 28704

[21] Appl. No.: 192,310

[22] Filed: Sep. 30, 1980

Related U.S. Application Data

[63] Continuation-in-part of Ser. No. 11,425, Feb. 12, 1979, Pat. No. 4,275,689, which is a continuation-in-part of Ser. No. 814,662, Oct. 27, 1977, abandoned.

[51] Int. Cl.$^3$ .................. F04B 45/06; F01B 19/00
[52] U.S. Cl. ............................................. 417/437
[58] Field of Search ............... 417/269, 270, 437; 92/98 R, 101, 103 F, 103 M

[56] References Cited

U.S. PATENT DOCUMENTS

| | | | |
|---|---|---|---|
| 2,160,978 | 6/1939 | Mock | 417/269 |
| 2,322,181 | 6/1943 | Vincent | 92/103 M |
| 2,370,506 | 2/1945 | Tabb | 417/270 |
| 2,421,866 | 6/1947 | Benzel | 92/101 |
| 2,710,629 | 6/1955 | Price | 92/103 F |
| 2,869,585 | 1/1959 | Baker | 92/101 |
| 3,019,738 | 2/1962 | Zuboty | 92/101 |
| 3,129,702 | 4/1964 | Arbanas | 417/269 |
| 3,296,976 | 1/1967 | Soeters | 417/269 |
| 3,581,034 | 3/1969 | Schupp | 92/98 R |

FOREIGN PATENT DOCUMENTS 475036 4/1929 Fed. Rep. of Germany ...... 417/270

Primary Examiner—William L. Freeh
Attorney, Agent, or Firm—Pollock, Vande Sande & Priddy

[57] ABSTRACT

Apparatus for fuel injecting one or more cylinders of an internal combustion engine. At least one fuel injector pump comprising a fuel inlet passage having a valve assembly connected thereto is provided for directing a quantity of fuel in a single direction into a pressure chamber. A diaphragm in the pressure chamber is flexed by a tappet in response to a cam roller forcing a quantity of fuel into an outlet chamber having a spring actuated valve member closing the outlet until sufficient pressure is exerted by the diaphragm.

3 Claims, 2 Drawing Figures

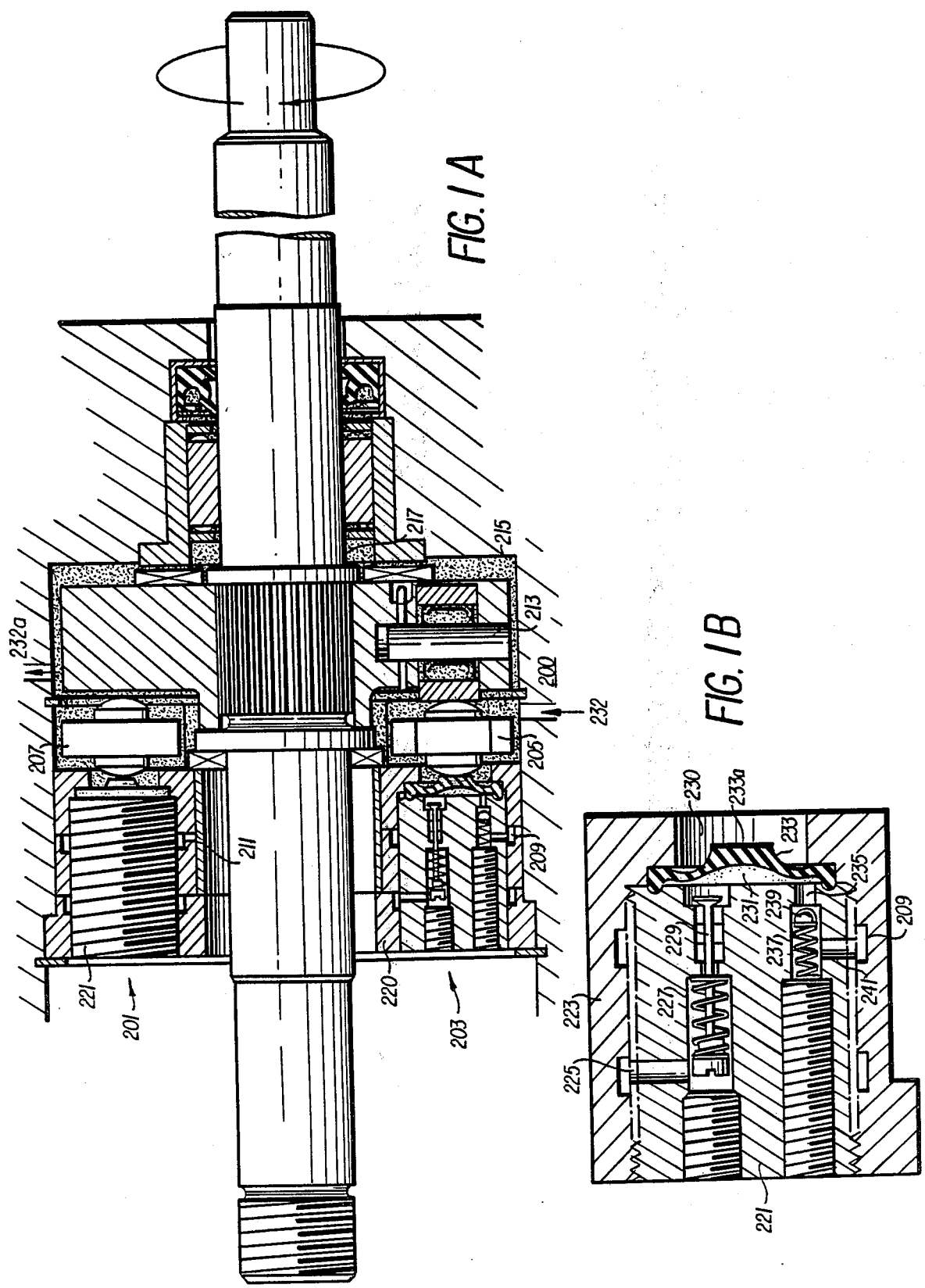

FUEL INJECTION APPARATUS FOR INTERNAL COMBUSTION ENGINES

BACKGROUND OF THE INVENTION

This is a Continuation-in-Part application of Ser. No. 11,425 filed Feb. 12, 1979 now U.S. Pat. No. 4,275,689 which is in turn a Continuation-in-Part application of Ser. No. 814,662 filed Oct. 27, 1977 in the U.S. Patent and Trademark Office now abandoned.

The subject matter of the present invention relates to fuel injected internal combustion engines. Specifically, fuel injection apparatus is described for sequentially injecting a quantity of fuel into one or more cylinders of an internal combustion engine.

As energy supplies have become increasingly scarcer and costlier, numerous techniques of fueling internal combustion engines have been developed to conserve on the rise of fuel. Fuel injection has become widespread in an effort to reduce fuel consumption. Prior art fuel injection techniques have, however, resulted in the use of complicated injector pumps comprising precision components which are expensive and difficult to repair.

SUMMARY OF THE INVENTION

It is an object of this invention to provide sequential fuel injection into an internal combustion engine.

It is a specific object of this invention to provide multiple fuel injection pumps for a fuel injected internal combustion engine which is simple in construction, requiring only minimum maintenance.

These and other objects of the invention are accomplished by providing a duel injector which dispenses a measured quantity of fuel in response to the rotation of a cam roller mounted on a disk driven by a power shaft.

In one embodiment of the invention, an inlet channel is provided having an inlet connected to a pressurized source of fuel and an outlet for delivering fuel into a pressure chamber. A valve member is located in the channel which permits a one-way flow of fuel into the pressure chamber. The pressure chamber includes a flexible diaphragm opposite the outlet which sealingly divides the pressurized chamber into two components. Adjacent the inlet on the same side of the diaphragm is an outlet channel which connects the pressure chamber with the exterior of the injector. The outlet channel also includes a valve member biased to close the outlet until a predetermined pressure is exerted by the diaphragm.

The remaining side of said diaphragm communicates with a tappet. As the disk member rotates, the tappet is struck by the cam roller which flexes the diaphragm forcing fuel into the outlet.

DESCRIPTION OF THE DRAWINGS

FIG. 1A is a sectional view of a fuel injector assembly in accordance with a preferred embodiment of the invention.

FIG. 1B is an enlarged view of a fuel injector used in the embodiment of FIG. 9A.

DESCRIPTION OF THE PREFERRED EMBODIMENT

The internal combustion engine of the aforementioned patent application is fuel injected with a pump assembly which is preferable according to the pump assembly shown in FIG. 1A. The pump assembly 200 comprises two injector pumps 201 and 203 mounted opposite each other. Each injector pump 201 and 203 has an actuating member 205, 207 which when axially moved results in a predetermined quantity of fuel to be produced from outlets 209, 211.

Actuating members 205 and 207 are sequentially axially moved by a cam roller 213 located on a rotatable disk 215. Disk 215 is suitably coupled to a shaft 217 through a spline arrangement. Shaft 217 is rotated by cam shaft or other means coupled to the internal combustion engine crank shaft. The axis of rotation of disk 215 is selected to be along a line which is coincident with a line midway between the actuating members 205, 207. Cam roller 213 is located on a radius of the disk 215 whereby the cam roller 213 will alternately strike and axially move actuating members 205, 207 providing alternate pulses of fuel from outlets 209 and 211.

FIG. 1A indicates that injector pumps 201 and 203 may comprise a subassembly 220 and 221 which may be threaded to a fixed housing or stationary part of the internal combustion engine 223. The actuating means 205, 207 includes a tappet engaging the subassembly.

The subassembly may be more clearly understood by referring to FIG. 1B. Inlet 225 is adapted to receive a fuel from a reservoir not shown through an annular passage in the housing. Fuel entering inlet 225 enters a first channel 227 equipped with a spring loaded valve 229. The first channel 227 terminates in a compartment 231 which is divided by a diaphragm 233. The diaphragm 233 may be steel with double back curves which readily flex upon being struck. On the rear side of the diaphrgm 233 is a portion 233a which extends through compartment 231 and is engageable with the tappet of the actuating members 205, 207. The tappet resides in a bore 230 of the housing 223. The remaining portion of the compartment 231 may be back filled with an oil under pressure maintaining the diaphragm from blowing outward due to fuel pressure. Oil may be forced into the rear side of the compartment 231 from an oil lubrication pump used in the internal combustion engine through inlet 232 to apply pressure to the rear side of the steel diaphragm. The entire chamber housing is pressurized and oil leaves through 232a to a collection chamber at a pressure lower than the inlet pressure. The housing is equipped with appropriate seals to prevent leaking of oil.

Compartment 231 has an outlet 235 which enters a second channel 237 equipped with a spring loaded ball 239. The second channel 237 terminates in an outlet 241 providing the discharged fuel through an annular passage 209 in the housing 223.

The operation of the subassembly is such that fuel may enter inlet 225 with sufficient pressure that valve 229 opens to fill compartment 231. When diaphragm 233 is flexed, fuel in the compartment 231 is forced past ball 239 to outlet 241. The pressure applied to the fuel by diaphragm 233 closes valve 229 prohibiting fuel from being forced into channel 227 from compartment 231.

Thus there is described a fuel injector assembly suitable for fuel injecting an internal combustion engine.

Thus there is described an improved fuel injector apparatus for an internal combustion engine mechanism for burning a stratified charge coupled with improvements defined more particularly by the claims which follow.

I claim:

1. A fuel injection apparatus for supplying pulsating fuel streams comprising:

first and second injection pumps mounted on different sides of an axis of a rotating shaft, each of said injector pumps comprising a compartment separated by a steel diaphragm into a fuel receiving compartment and an oil receiving compartment, said diaphragm displaceable in a direction parallel to said axis into said fuel receiving compartment;

a fuel inlet including a spring load valve for emitting fuel to said fuel receiving compartment;

a fuel outlet including a spring loaded ball member for receiving a stream of fuel from said fuel receiving compartment in response to a displacement of said diaphragm;

first and second actuating members having first and second ends entering said oil receiving compartment in contact with said diaphragm for axially displacing said diaphragms; a rotating disk having an axis of rotation coincident with said rotating shaft axis, said disk including a cam roller on a radius of said disk facing said actuator members for alternately striking each of said actuating members whereby each diaphragm is alternately displaced to produce pulsating streams from said fuel outlets; and means for supplying oil pressure to said oil receiving compartment whereby said diaphragm is prohibited from blowing outward due to fuel pressure.

2. The injection apparatus of claim 1, wherein each of said diaphragms include double arches connected together by a substantially flat striking surface.

3. The injection apparatus of claim 2, wherein said first and second actuating members are tappets having an end extending through said oil receiving compartment contacting said striking surface, and a remaining end for striking said cam roller.

* * * * *